United States Patent [19]

Gray et al.

[11] Patent Number: 5,571,997
[45] Date of Patent: Nov. 5, 1996

[54] PRESSURE SENSITIVE POINTING DEVICE FOR TRANSMITTING SIGNALS TO A TABLET

[75] Inventors: Donald F. Gray, Phoenix; Michael M. Malkin, Scottsdale, both of Ariz.

[73] Assignee: Kurta Corporation

[21] Appl. No.: 101,442

[22] Filed: Aug. 2, 1993

[51] Int. Cl.⁶ .............................. G08C 21/00; G09G 3/02; H04L 15/08
[52] U.S. Cl. .................. 178/18; 178/19; 178/20; 178/87; 345/173; 345/179; 345/180
[58] Field of Search ................................ 178/18, 87, 19, 178/20; 345/173, 179, 180

[56] References Cited

U.S. PATENT DOCUMENTS

| | | | |
|---|---|---|---|
| Re. 34,187 | 3/1993 | Yamanami | 178/19 |
| 3,598,903 | 8/1971 | Johnson et al. | 178/18 |
| 4,111,052 | 9/1978 | Sniderman | 178/18 |
| 4,642,459 | 2/1987 | Caswell | 345/179 |
| 4,667,182 | 5/1987 | Murphy | 178/18 |
| 4,672,154 | 6/1987 | Rodgers et al. | 178/18 |
| 4,717,793 | 1/1988 | Kobayashi | 178/18 |
| 4,748,295 | 5/1988 | Rogers | 178/19 |
| 4,786,764 | 11/1988 | Padula | 178/19 |
| 4,786,765 | 11/1988 | Yamanami | 178/19 |
| 4,801,771 | 1/1989 | Mizuguchi | 178/18 |
| 4,896,543 | 1/1990 | Gullman | 382/3 |
| 4,992,630 | 2/1991 | Mletzko | 178/18 |
| 5,004,872 | 4/1991 | Lasley | 178/18 |
| 5,045,645 | 9/1991 | Hoendervoogt et al. | 178/19 |
| 5,070,217 | 12/1991 | Kobayashi et al. | 178/19 |
| 5,120,908 | 6/1992 | Zank | 178/19 |
| 5,122,623 | 6/1992 | Zank et al. | 178/19 |
| 5,136,125 | 8/1992 | Russell | 178/19 |
| 5,138,118 | 8/1992 | Russell | 178/19 |
| 5,214,414 | 5/1993 | Levine et al. | 340/709 |
| 5,218,174 | 6/1993 | Gray | 178/19 |
| 5,225,637 | 7/1993 | Rodgers et al. | 178/19 |
| 5,239,489 | 8/1993 | Russell | 178/18 |
| 5,247,137 | 9/1993 | Epperson | 178/18 |

*Primary Examiner*—Wellington Chin
*Assistant Examiner*—Vijay Shankar
*Attorney, Agent, or Firm*—Cahill, Sutton & Thomas P.L.C.

[57] ABSTRACT

A pressure sensitive pointing device or pen is described for use with an electronic tablet that determines the position of the pointing device on the surface of the tablet. The pointing device incorporates a variable reluctance circuit responsive to the force exerted on the pen point for modulating a radiating frequency, emanating from the pen, in proportion to the force.

16 Claims, 5 Drawing Sheets

PRESSURE SENSITIVE POINTING DEVICE FOR TRANSMITTING SIGNALS TO A TABLET

FIELD OF THE INVENTION

The present invention pertains to digitizer or tablet systems incorporating pointing devices such as pens or cursors wherein signals are generated by the pointing device and radiated onto the surface of the tablet. In addition to locating the position of the pointing device on the tablet surface, additional information, including control information, is usually necessary. In some applications, it is advantageous to be able to ascertain the pressure being applied by the user on the pen against the surface of the tablet, or the pen tip displacement caused by such pressure. This pressure sensing technique provides a means for utilizing the pressure information in a variety of programs that can use this information to generate signals representing such things as line width, line darkness (gray scale signals) or color.

BACKGROUND OF THE INVENTION

The pointing device of the present invention will be described in terms of a pen; the device may take other forms such as a cursor or mouse, but selection of a pen for purposes of description will facilitate understanding the invention. Therefore, references herein to "pen" should be interpreted to include other forms of pointing devices. A predetermined frequency is generated within the pen and is transmitted to the tablet surface. The location of the pen is determined by sensing the radiated signal using grid conductors within the tablet in the manner described in U.S. Pat. Nos. 5,218,174 and 5,225,637 assigned to the assignee of the present invention.

In the embodiment chosen for illustration, a predetermined nominal frequency is utilized as the signal being radiated from the pen to the tablet; information relating to the pressure being exerted by the user on the pen as it is forced against the surface of the tablet is contained in the variation of the frequency of the signal being radiated. The frequency is thus varied over a predetermined range in an manner that is related to the force being applied on the pen stylus by the user. The force applied by the user results in limited motion of the pen stylus, the initial motion of which is utilized to actuate a pen down switch; this switch actuation may be used to provide a signal to be radiated by the pen to the tablet to inform the latter that the pen is in contact with the tablet surface. Additional force applied by the user is subsequently utilized as a means for varying the radiated frequency to provide a basis for the tablet system to determine the force being used by the user as the pen travels over the surface of the tablet.

Prior art systems have attempted to sense force changes being applied to the pen through the utilization of magnetically permeable slugs that move in relation to an inductor. This technique requires a relatively long axial pen point or stylus displacement thus yielding a "spongy" or imprecise feel to the pen. Such systems may also make it difficult to modulate the output signal at light pen pressures. Such systems typically induce changes in system permeability and use phase changes to represent pen pressure.

Other prior art systems use force sensing resistors activated by the pressure exerted by the user on the pen. Such systems are complicated by the fact that relatively complicated circuitry is required to measure resistance change which is used to vary the capacitance of a variable capacitor, and which in turn is used to implement a frequency change. Resistance change systems typically exhibit abrupt initial signal changes; that is, as predetermined activation force is reached, the system transition to frequency modulation is abrupt. In such systems, independent adjustment of characteristics of the variable resistances is not possible; further, it may not provide repeatability because of changes of the characteristics through time and use and the tendency of such resistors to exhibit memory.

OBJECTS OF THE INVENTION

It is therefore an object of the present invention to provide a pressure sensitive pen system incorporating a minimum number of components and which is reliable.

It is another object of the present invention to provide a pressure sensitive pen system that provides a desirable "feel" to the user by sensing pen pressure with a minimum of pen point or stylus axial movement.

It is still another object of the present invention to provide a pressure sensitive pen system utilizing an analog shift in radiated frequency proportional to the pressure being exerted by the pen on a tablet surface.

It is still another object of the present invention to provide a pressure sensitive pen system utilizing a variable reluctance technique for modifying an oscillator tank circuit to cause frequency modulation proportionate to the pressure being exerted by the pen on a tablet.

It is still another object of the present invention to provide a pressure sensitive pen system incorporating a variable reluctance technique to vary the frequency of radiated signals from the pen and which permits easy adjustment of pre-load force while separating the functions of transducer adjustment from pen down switch functions.

It is still another object of the present invention to provide a pressure sensitive pen system incorporating a variable reluctance technique that permits the setting of required activating forces without affecting the operation of the variable reluctance sensor.

It is still another object of the present invention to provide a pressure sensitive pen system incorporating a variable reluctance technique that allows cooperative operation of the pen down system and force transducing system in the presence of relative misalignment.

These and other objects of the present invention will become apparent to those skilled in the art as the description proceeds.

SUMMARY OF THE INVENTION

Briefly, in accordance with the embodiment chosen for illustration, the present invention incorporates a pointing device such as a pen stylus terminating at one end in a pen point and being mounted for limited axial movement within a pen barrel. The opposite end of the stylus is positioned within a stylus support member that acts as a spring guide supporting a coil spring urging the stylus axially outwardly of the pen barrel. The stylus support member carries moveable contacts that engage fixed contacts within the barrel and limit the outward axial movement of the stylus. The stylus support member abuts the actuating rod of a force sensing system that contains a variable reluctance element for connection to an oscillator secured within the pen. Pressure on the pen tip first causes the opening of the contacts to provide a signal to the system that the pen is "down" or in contact with the tablet surface; further pressure on the pen tip results in minimal axial movement but in a change in the radiating frequency of the pen.

BRIEF DESCRIPTION OF THE DRAWINGS

The present invention may more readily be described by reference to the accompanying drawings in which:

FIG. 2 has been rotated 180° about the pen axis relative to FIG. 1 to illustrate the opposite side.

DETAILED DESCRIPTION OF THE PREFERRED EMBODIMENT

Figure 1:
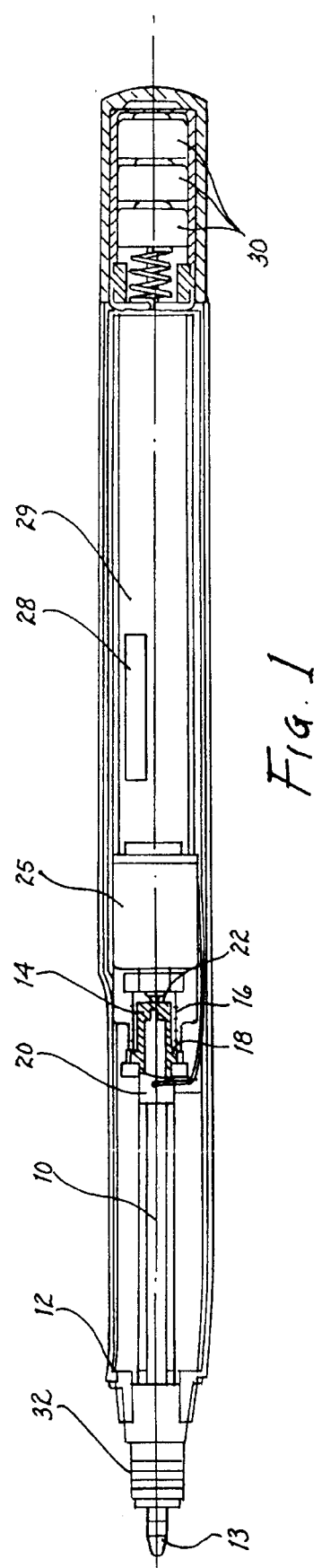
FIG. 1 is a pressure sensitive pen constructed in accordance with the teachings of the present invention having selective portions removed to expose the interior.
Figure 2:
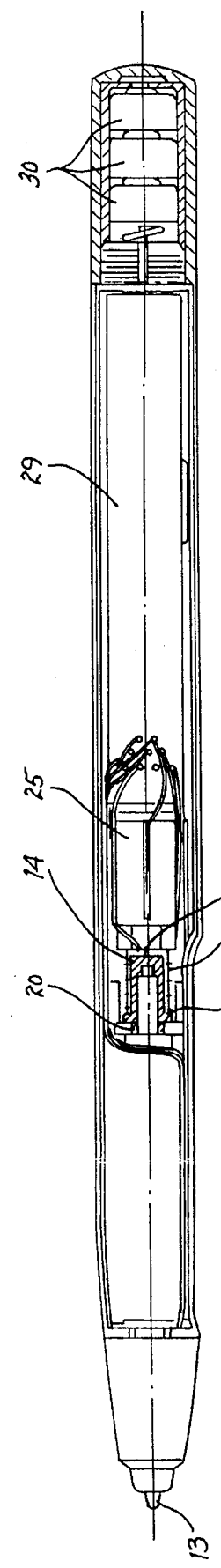
FIG. 2 is an in illustration of the pen of the present invention shown in FIG. 1 with portions removed to show the pen interior.

Referring to FIGS. 1 and 2, the embodiment chosen for illustration utilizes a pen stylus 10 that is mounted within a carrier or pen barrel 12; the stylus is permitted limited axial movement into the barrel. A pen point 13 is positioned at one end of the stylus and the opposite end of the stylus slidably extends into and is supported by a stylus support member 14. The stylus support member 14 also supports a coil biasing spring 16 that urges the stylus outwardly of the barrel (toward the left in FIGS. 1 and 2). A moveable contact 18 is mounted on or may be formed as part of the metal stylus support member 14 and is urged into contact with a fixed contact 20 through operation of the coil biasing spring 16. The contacts 18 and 20 form a "push away" switch; therefore, the initial force exerted by the user upon the pen point, and thus upon the stylus, results in the compression of the coil biasing spring causing limited movement of the stylus into the barrel which in turn results in the opening of the contacts. The method of setting the initial travel of the stylus, and limiting this initial travel will be discussed more fully hereinafter.

This initial opening of the contacts generates a "pen down" signal which may be utilized by the pen system for various logical functions, including the generation of appropriate signals for transmission to the tablet to indicate that the pen is now in contact with the surface of the tablet, or may simply be used to turn the pen on. With the stylus thus extending into the pen barrel and compressing the coil biasing spring, the initial pressure exerted by the user upon the pen results in an appropriate "pen down" signal radiated by the pen to the tablet. This pressure is predetermined by the choice of the specific biasing means, and in the embodiment chosen for illustration, the coil biasing spring 16. It has been found that a force of approximately twenty grams is an appropriate predetermined force to insure the positive, but light, force necessary to activate the system. When the stylus has been forced against the pressure of the coil biasing spring 16 sufficient to cause the opening of the contacts 18 and 20, the stylus support member 14 comes into abutting contact with the tip 22 of an actuating rod forming a part of the force measuring system 25. The force measuring system 25 provides a means for varying the reluctance of a circuit for utilization in the tank circuit of an oscillator; the force measuring system will be described in greater detail hereinafter. An oscillator 28 is shown mounted on a circuit board 29 secured within the pen barrel. The power supply formed by one or more batteries 30 may be positioned at the end of the pen barrel opposite the pen point. A pen coil 32 is positioned adjacent the pen tip 13 and is connected to the oscillator 28 to direct signals generated by the oscillator onto the tablet surface.

Figure 3:
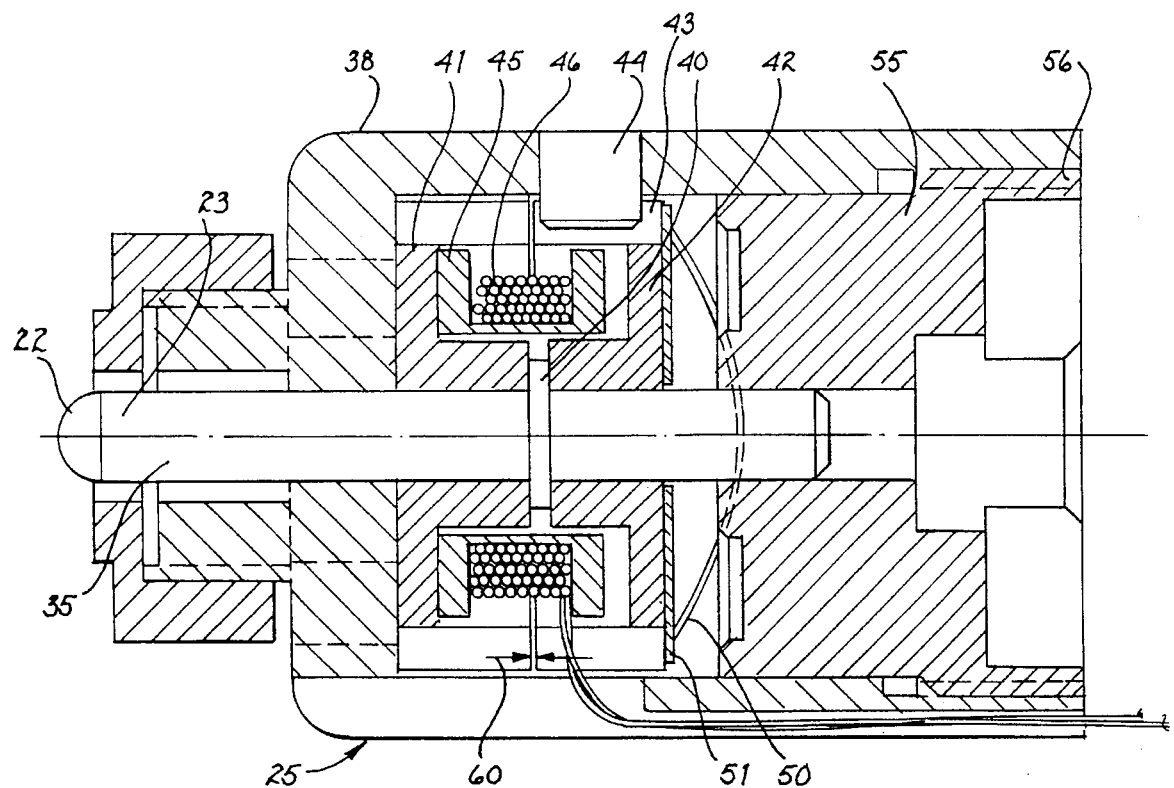
FIG. 3 is an enlarged cross-sectional view of the force measuring system incorporated in the pen of FIGS. 1 and 2.

Referring now to FIG. 3, the force measuring system 25 unit is shown in greater detail. The actuating rod 35 forms a part of a variable reluctance force measuring system, the output of which is utilized to vary the frequency radiated by the pen to the tablet to provide the latter with an indication of the force being exerted on the pen by the user. The actuating rod 35 extends into the housing 38 of the force measuring system and includes an annular shoulder 40 which is captured between two approximate halves 41 and 42 of a cup ferrite core, respectively. The ferrite cup core is formed in two approximate equal size parts, or approximately halves, the first half or portion 41 of which is fixed and is adhesively secured to the housing 38. A bobbin 45, containing an appropriate number of turns of electrical conductor 46, is also adhesively fixed to the fixed core portion 41. The cup core configuration of the variable reluctance device provides a convenient means for preventing stray fields from interfering with pen signals since the coil is essentially contained within the core. The core portions need not be actual halves of the core; one portion could be a plate configuration forming a closure or lid to the other cup-shaped portion with an appropriate air gap positioned between the portions.

The moveable portion or half 42 of the core abuts the actuating rod annular shoulder 40 and is urged axially into contact therewith through the use of a spring washer or spring plate 50 which in turn contacts a spring contact plate 51 adhesively secured to the moveable core half 42. An axial slot 43 is provided in core portions 41 and 42; the slot permits a key 44 to extend through the housing 38 into the slot to prevent core portion 42 from rotating about the actuating rod. Since core portion 41 is adhesively secured to the housing 38, no key is required. The spring plate 50 is maintained in position and is urged against the spring contact plate 51 through the utilization of a pre-load adjustment plug 55 that is threadedly engaged with interior threads 56 provided in the housing 38. Axial motion of the actuating rod 35 (that is, motion to the right as shown in FIG. 3) is imparted to the moveable core half 42 against the biasing force of the spring plate 50 resisting such movement through contact with the spring contact plate 51. The air gap 60 between the core halves thus increases with the increased axial displacement of the actuating rod.

The circuit connected to the coil 46 contained on the bobbin 45 is thus presented with a variable reluctance depending upon the force applied to the actuating rod. This force results in a displacement of the moveable core 42 against the force of the spring plate 50. The pre-load on the spring resulting from the positioning of the pre-load adjustment plug 55 is determined by screwing the plug into or out of the housing 38 to obtain an appropriate initial or pre-load force. In the embodiment chosen for illustration, the initial force exerted by the user on the stylus requires approximately twenty grams for the pen down contacts 18 and 20 to open and thus provide a pen down signal to be generated and transmitted by the pen to the tablet. The continued application of additional force to the stylus 10 will cause the stylus, through the stylus support member 14 at the end thereof, to contact the tip 22 of the actuating rod 35 and urge the actuating rod to the right as shown in FIG. 3. This attempted movement will be resisted by the pre-load force adjustment of the adjustment plug 55 and its contact with the spring plate 50. It has been found that a force on the stylus of approximately fifty grams should result in slight movement of the moveable core 42, and thus a slight change in the air gap 60, to provide a reluctance change to the circuit connected to the coil. The increase in force beyond fifty grams up to a maximum force (which may be approximately four hundred grams) should result in a continuing variation of the reluctance caused by the increasing air gap.

Figure 4:
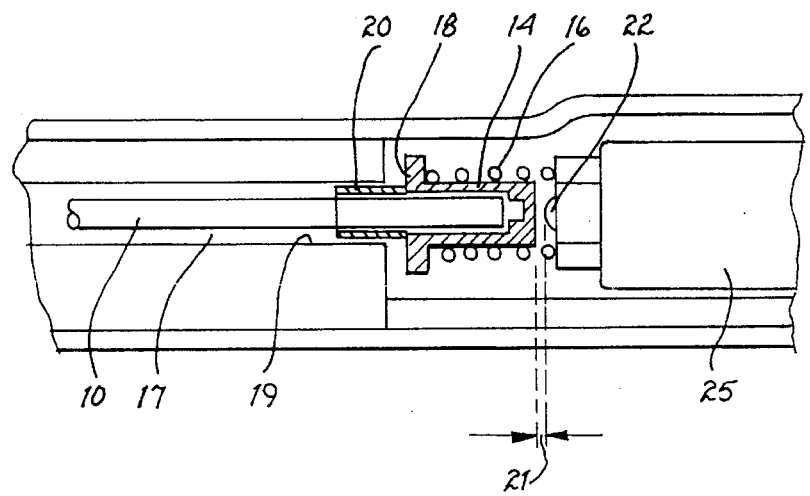
FIG. 4 is an enlarged portion of the pressure sensitive pen of FIG. 1 useful for describing the procedure of setting initial pen travel.

The initial travel of the stylus to effect an opening of contacts 18 and 20 is limited to the axial distance necessary for the stylus support member to move axially into abutting contact with tip 22 of the actuating rod of the force measuring system 25. This relationship may best be seen by reference to FIG. 4. Contact 18 formed as part of stylus support member 14 is movable against the force of the biasing spring 16 into abutting contact with the tip 22 of the actuating rod. The stylus 10 is slidably inserted into the stylus support member 14; thus, axial force exerted on the stylus 10 forces the stylus support member against the biasing force of the spring 16 to cause the stylus support member and the integral contact 18 out of engagement with the contact 20. It is important that this initial travel to cause the opening of the contacts be appropriately established and be uniform in successive pens without the adjustment of the limit of this motion interfering with the adjustment of or the operation of the force measuring system 25. Therefore, the initial spacing 21 between the end of the stylus support member 14 and the actuating rod tip must be controlled during manufacture.

To effect this control, this initial travel is determined by using a jig or gauge inserted between the actuating rod tip 22 and the stylus support member 14 and forcing the support member and contacts 20 to the right so that the contact 20, contact 18, support member 14 and the feeler gauge or jig is firmly in contact with the tip 22 of the actuating rod. When this position has been determined, the stationary contacts 20 are then fixed by cementing them in place to the interior surface 19 of the channel 17. The gauge may then be removed and the initial travel of the pen down spring and support member are accurately set. It has been found that the initial spacing 21 may be set at approximately two thousandths of an inch although smaller spacing will still provide adequate initial travel. It may even be desirable under certain circumstances to reduce the spacing to zero such that the support member is barely in contact with the tip 22 and with essentially no measurable force being exerted on the tip. Regardless of the spacing chosen, the method for setting the spacing described above permits accurate and repeatable settings.

The variable reluctance of the coil is connected to an oscillator circuit to provide a frequency the variations of which are monotonically proportional to the force applied to the pen. The variable reluctance may be utilized to vary the frequency of a tank circuit by incorporating the coil in the tank circuit; that is, utilizing the change in the reluctance of the coil to modify the oscillating frequency of an oscillator's tank circuit. In the embodiment chosen for illustration, the coil 46 (FIG. 3) is placed in series with a capacitance with this series circuit connected across the inductance of the tank circuit of the pen oscillator.

Figure 5:
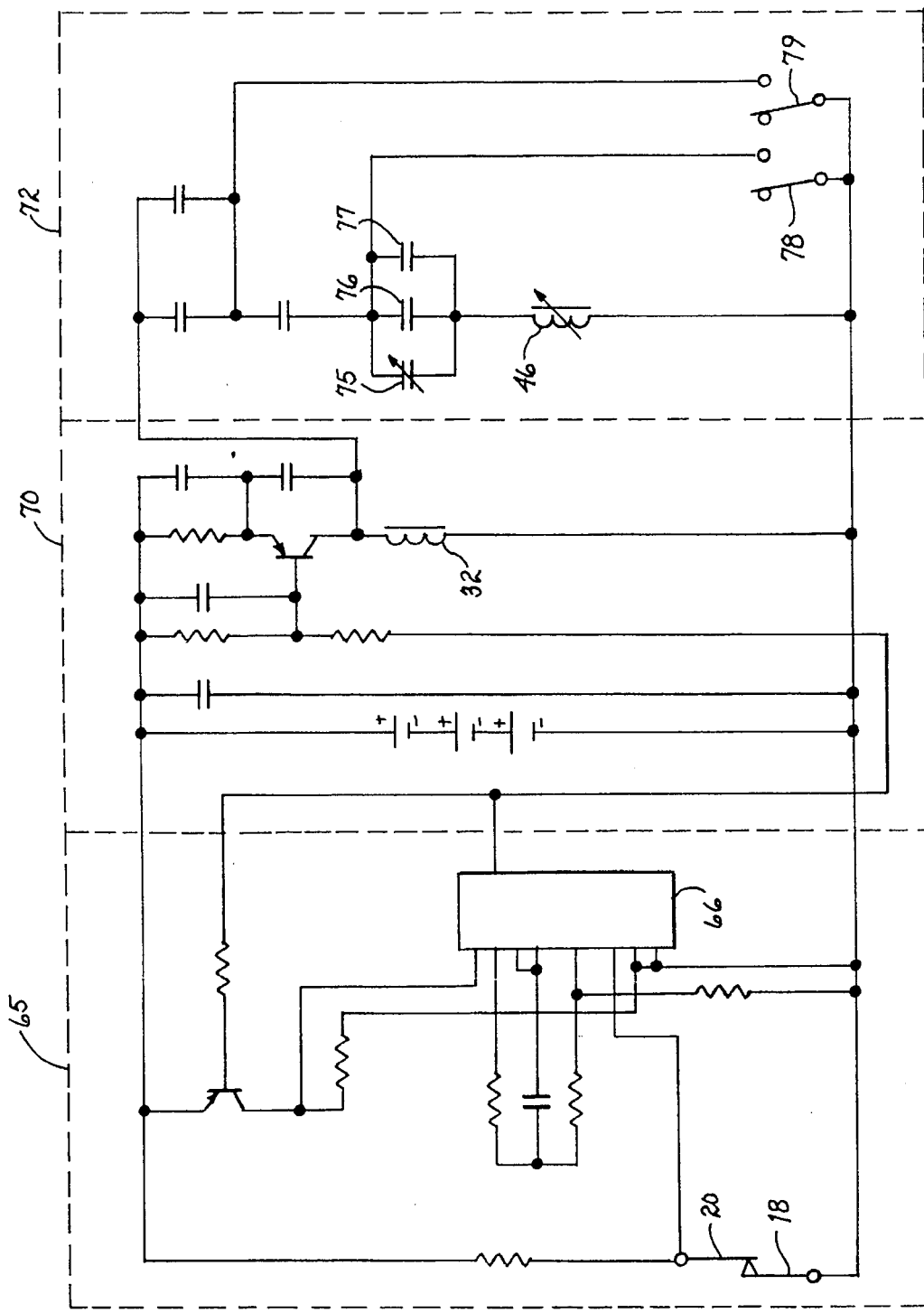
FIG. 5 is a schematic circuit diagram of an oscillator circuit utilized in the pen of the present invention.

A circuit for utilization of the signal derived from the variable reluctance coil is shown in FIG. 5. Referring to FIG. 5, the circuit may generally be divided into three functional groups. The first may be termed a run-out timer circuit 65. That is, pen down switch contacts 18 and 20, when opened, provide a means for deriving a pen down signal to be radiated from the pen to the table; however, when the switch contacts are closed as shown in FIG. 5, the pen is not being used. To prevent power loss and battery drain during periods of non-use, the system may conveniently utilize a run out timer circuit 66; utilizing such circuits, it is possible to detect the closure of the pen down switch contacts and begin a timing period (for example two to ten minutes) after which the circuit is turned off and all further battery drain ceases. The particular type of circuit utilized for this feature forms no part of the present invention. For further discussion, reference may be had to U.S. Pat. Nos. 5,218,174 and 5,225,637 assigned to the assignee of the present invention.

A second portion of the circuit illustrated in FIG. 5 may be referred to as the general oscillator circuit 70. In the embodiment chosen for illustration, a common base Colpits oscillator format is utilized. The tank circuit of the oscillator includes the pen coil 32 described previously that is utilized for radiating the signal from the pen to the tablet. The particular oscillator chosen is simple and provides many advantages. The AC voltage across the pen coil 32 is a function of the battery voltage and thus provides an efficient predetermined amplitude not significantly affected by the Q of the oscillator. Thus, the pen radiating signal amplitude remains stable even though frequency of oscillation may change.

A third portion of the circuit illustrated in FIG. 5 may be referred to as a frequency modulating circuit 72 and includes the coil 46 of the ferrite core described above. To achieve the desired frequency modulation, and avoid the necessity of a very large variable inductance to slightly modify the inductance of the tank circuit (when compared to the inductance of the pen coil), the force sensing and frequency modulating portion of the circuit 72 incorporates a capacitance 75, 76 and 77 in series with the ferrite core coil 46 variable inductance. In this manner, the total reactance of the series circuit incorporating the ferrite core inductance and capacitances is capacitive. Thus, a change in the reluctance of the ferrite core caused by the slight movement of one core portion vs. the other core portion (an increase in the air gap) will result in a change in the capacitive reactance of the circuit paralleling the pen coil 32 (the transmitting coil) and a change in frequency. Since the oscillator amplitude is controlled by battery voltage, a modulation or shift in frequency will not affect the radiated signal amplitude. Switches 78 and 79 permit the pen user to lock out frequency changes and operate at a predetermined frequency without modulation. The closing of either switch bypasses the variable inductance of the ferrite core and locks in either of two predetermined frequencies without regard to pen pressure and without frequency modulation.

Figure 6:
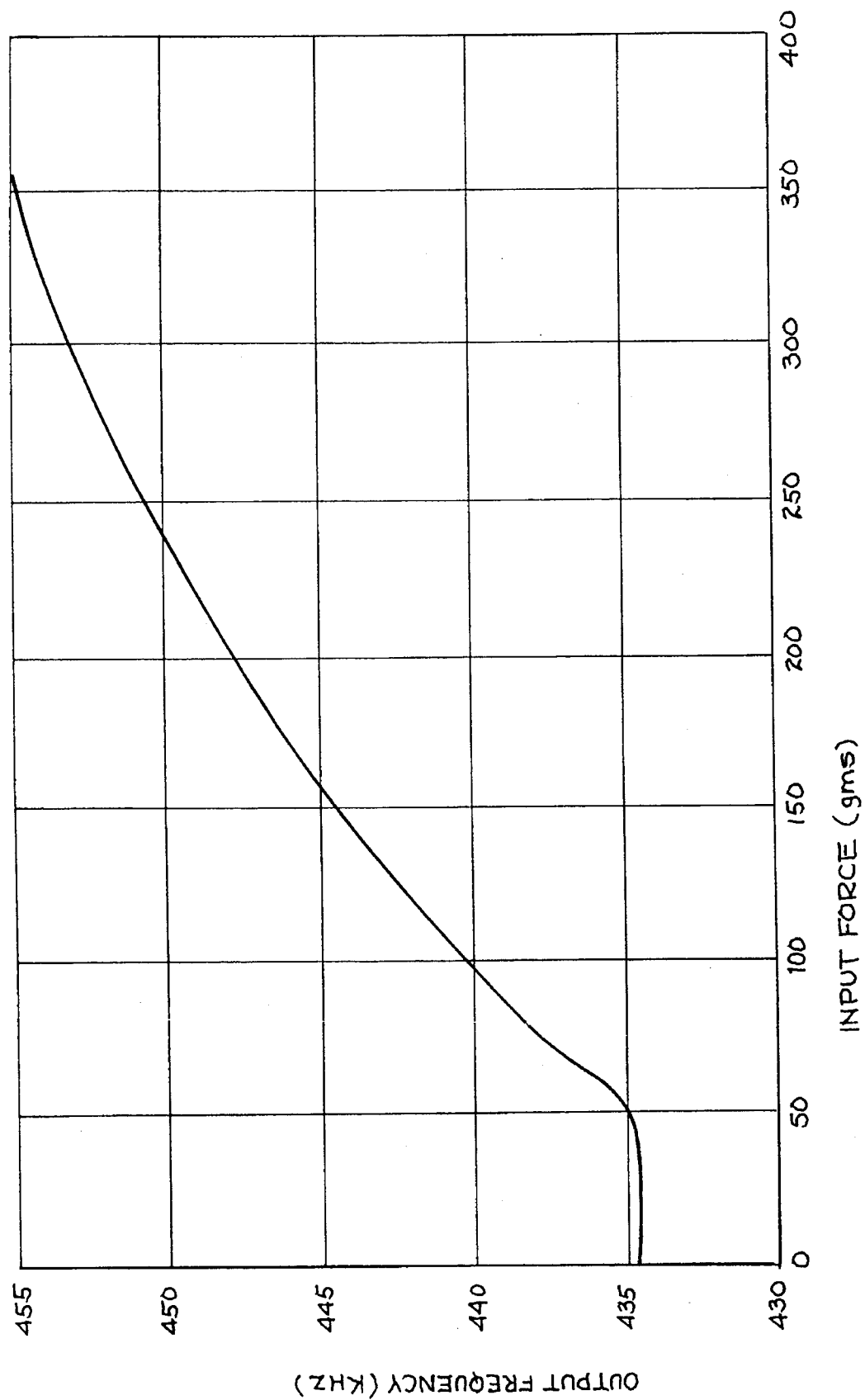
FIG. 6 is a frequency-force curve useful in describing the operation of the system of the present invention.

The effect of increasing pressure on the transmitted frequency may be seen by referring to FIG. 6. FIG. 6 is a typical frequency vs. force curve of a pressure sensitive pen constructed in accordance with the teachings of the present invention. Referring to FIG. 6, it may be seen that while the first approximate twenty grams of force exerted by the user on the pen against the tablet may result in a "pen down" signal, no variation is made in the frequency of the radiated signal. As the force increases, a point is reached (approximately fifty grams) where the output frequency begins to increase; thereafter, as the force increases, the output frequency increases. While the actuation of the pen down switch as well as the force related variation in frequency result from the pressure applied by the user on the pen stylus, the two functions have been mechanically separated such that the critical nature of the pre-load required for proper operation of the frequency varying portion of the system may accurately be adjusted without affecting the operation of the pen down switch. That is, while the initial force on the pen tip (approximately twenty-five grams) would result in the opening of the appropriate contacts to cause a pen down signal to be generated, the force measuring apparatus remains substantially inactive. It is only after the predetermined initial force of sufficient magnitude to overcome the pre-load (approximately fifty grams) occurs that the force measuring system becomes active.

The system permits the utilization of a high spring constant (for example twenty grams per mil) to minimize axial motion of the stylus in response to forces exceeding the pre-load amount which in turn provides a uniquely desirable "feel" to the pen during use. That is, when a user operates a pressure sensitive pen, the variable force applied to the pen by the user should not result in the stylus pushing onto the barrel of the pen (or receding into the barrel of the pen) to such an extent that would in effect yield a "spongy" feel to the pen. The present system provides a very "stiff" pen feel which is desirable and which users find most natural. The spring system incorporated in the present invention provides a small displacement for maximum force or high force per unit displacement to thus provide the above described desirable "feel". The particular spring chosen for the embodiment illustrated above exhibits the additional desired characteristic of predictable seating characteristics. That is, no changes in physical positioning are exhibited over time. While a spring plate or spring washer type of spring has been chosen for illustration, other types of spring or spring systems may be utilized; however, the high force per unit displacement is a necessity and the system should exhibit low friction and predictable seating characteristics as described above.

The ability of the system of the present invention to separate the operation of the pen down switch from the force transducer even though both are actuated through forces acting on the pen tip and stylus, permits the system to be adjusted with an appropriate pre-load while exhibiting smooth and progressive characteristics resulting from the application of force and the conversion of that force into a corresponding modulation in the output frequency. It may be noted that while a single force and axially inward motion of the pen stylus results in the sequential opening of the pen down switch contacts and subsequent motion of a core half of the variable reluctance transducer, the adjustment of the pre-load for the force sensing system is independent of the pen down switch operation. A single motion of the pen stylus effectively mechanically operates in parallel so that the critical parameters of the transducers, such as air gap and pre-load, may be set independent of the mechanical operation of the pen down switch.

Figure 7:
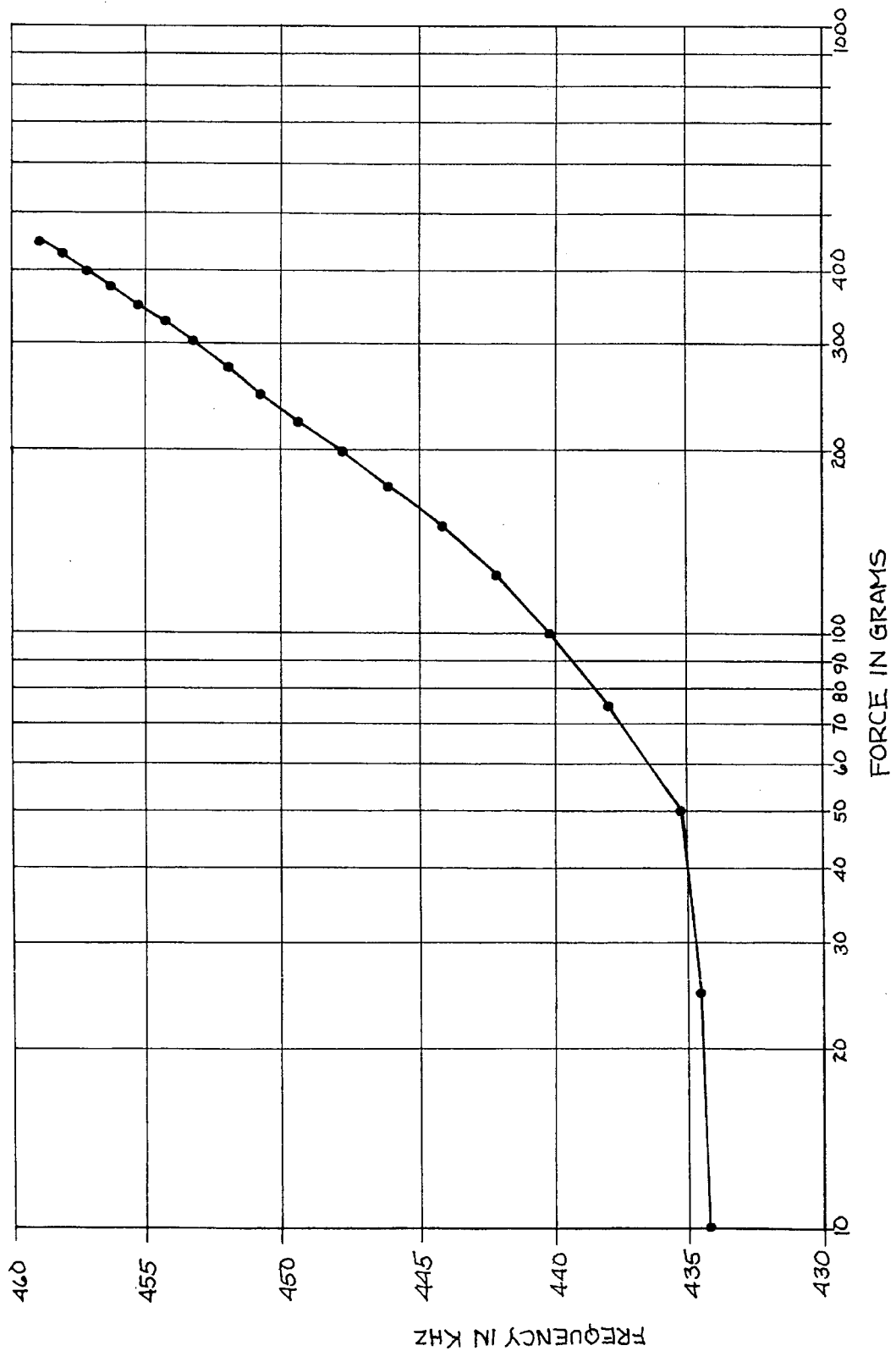
FIG. 7 is a frequency-force curve plotted on a semi-log scale useful in describing the operation of the system of the present invention.

It is important for pressure sensitive pen systems not to exhibit discontinuities in the signals derived through the application of force; this latter statement is particularly true at the initiation of the force above the predetermined threshold value. Any abruptness such as an initial surge in the signal will destroy its accuracy and usefulness. The curve of FIG. 6 represents a typical curve of the input force and resulting output frequency of the system of the present invention; FIG. 7 represents a typical curve of the input force and resulting output frequency plotted on semi-log paper. It may be seen by reference to FIG. 7 that the initial portions of the curve are not any steeper (the rate of change is not any greater) than any portion of the remainder of the curve. If the latter statement were not true, the abruptness of the rate of change would cause a discontinuity during initial transduction as the applied force exceeds the threshold or pre-load of the system. It is therefore important that the system permit a smooth transition from a force above that required to operate the pen down switch to and above the force exceeding the pre-load to thereby cause a predictable and progressive change in frequency.

Having thus described the invention, it will be apparent to those skilled in the art that various modifications, in addition to the alternative previously noted, can be made within the scope of the invention. For example, while the description and the chosen embodiment have referred to a pressure sensitive pen, it will be obvious to those skilled in the art that other pressure sensitive pointing devices may be utilized, such as a cursor or mouse. The specific circuit utilized to generate the radiated pen signals may take any of several well known forms. Further, while the force vs. frequency characteristics appear to be substantially linear, significant deviation from linearity may be tolerated or under certain circumstances may even be desirable. The receiving circuitry within the tablet can easily be modified to utilize or compensate for any such non-linearity. The technique described in the chosen embodiment utilized frequency modulation; however, amplitude modulation may be appropriate under some circumstances and is intended to be included within the scope of the invention.

What is claimed is:

1. A pressure sensitive pen for transmitting signals to a tablet comprising:
   (a) a stylus mounted within a carrier for limited axial movement and extending therefrom for contact with a surface;
   (b) switch means responsive to a first predetermined axial force applied to said stylus for generating a pen down signal; and
   (c) modulating means having a variable reluctance responsive to axial forces exceeding a second predetermined axial force larger than said first predetermined axial force for varying said reluctance and for modulating transmitted signals in proportion to said axial forces exceeding said second predetermined axial force.

2. The combination set forth in claim 1 wherein said modulating means comprises an oscillator having a tank circuit and a variable reluctance connected in parallel to said tank circuit for varying the frequency of oscillation.

3. The combination set forth in claim 1 including a first spring biasing means opposing said first predetermined axial force and a second spring biasing means opposing said second predetermined axial force.

4. The combination set forth in claim 3 wherein said modulating means comprises an oscillator having a tank circuit and a variable reluctance connected in parallel to said tank circuit for varying the frequency of oscillation.

5. In a pressure sensitive pen having an oscillator therein for transmitting signals to a receiving tablet, the improvement comprising:
   (a) a stylus mounted within a carrier for limited axial movement in response to axial forces applied to said stylus;
   (b) a ferrite core having a first portion secured to said carrier and a second portion mounted for axial movement with said stylus, said axial movement changing an air gap between said first and second portions; and (c) a winding in said ferrite core connected in parallel with a tank circuit of said oscillator wherein axial movement of said stylus changes said air gap and modifies the frequency of the signal being transmitted by said pressure sensitive pen.

6. The combination set forth in claim 5 including a spring biasing means for resisting said limited axial movement.

7. The combination set forth in claim 5 wherein said axial movement increases the air gap between said portions of said ferrite core.

8. The combination set forth in claim 6 including a pre-load adjustment means contacting said spring biasing means and adjustably positioned in said carrier for selecting a pre-load force on said spring biasing means.

9. A pressure sensitive pen for transmitting signals to a tablet comprising:

(a) a stylus mounted within a carrier for limited axial movement and extending therefrom for contact with a surface;

(b) switch means responsive to axial movement of said stylus for providing a pen down signal;

(c) an actuating rod mounted in said carrier and positioned to receive axial forces from said stylus;

(d) an oscillator mounted in said carrier and having a tank circuit for determining frequency of the signals transmitted by said pressure sensitive pen; and (e) a variable reluctance means mounted in said carrier connected to said tank circuit and responsive to axial forces received by said actuating rod from said stylus for changing its reluctance in response to changes in said force and to thereby modify the frequency of the signals transmitted by said pressure sensitive pen.

10. The combination set forth in claim 9 wherein said actuating rod is mounted coaxially with said stylus.

11. The combination set forth in claim 9 including a first spring biasing means mounted in said carrier opposing said axial movement of said stylus, and a second spring biasing means mounted in said carrier opposing axial movement of said actuating rod.

12. The combination set forth in claim 11 including a pre-loading adjustment means contacting said second spring biasing means and adjustably positioned in said carrier for selecting a pre-load force on said second spring biasing means.

13. The combination set forth in claim 9 wherein said variable reluctance means comprises a ferrite core having a first portion secured to said carrier and a second portion mounted for axial movement with said stylus, said axial movement changing an air gap between said first and second portions.

14. The combination set forth in claim 9 wherein said variable reluctance means comprises a ferrite core having a first portion secured to said carrier and a second portion mounted for axial movement with said stylus, said axial movement increasing an air gap between said first and second portions, and a winding in said ferrite core connected in parallel with said tank circuit whereby axial movement of said actuating rod reduces said air gap and modifies the frequency of the signal being transmitted by said pressure sensitive pen.

15. The combination set forth in claim 11 wherein said variable reluctance means comprises a ferrite core having a first portion secured to said carrier and a second portion mounted for axial movement with said stylus, said axial movement increasing an air gap between said portions, and a winding in said ferrite core connected in parallel with said tank circuit whereby axial movement of said actuating rod reduces said air gap and modifies the frequency of the signal being transmitted by said pressure sensitive pen.

16. The combination set forth in claim 12 wherein said variable reluctance means comprises a ferrite core having a first portion secured to said carrier and a second portion mounted for axial movement with said stylus, said axial movement increasing an air gap between said portions, and a winding in said ferrite core connected in parallel with said tank circuit whereby axial movement of said actuating rod reduces said air gap and modifies the frequency of the signal being transmitted by said pressure sensitive pen.

* * * * *